United States Patent [19]
Tamada

[11] Patent Number: 5,687,142
[45] Date of Patent: Nov. 11, 1997

[54] DISC APPARATUS HAVING A PLURALITY OF READING/RECORDING HEAD DRIVING MANNERS FOR DISC TRACK SEEKING MOVEMENT

[75] Inventor: Hikaru Tamada, Inagi, Japan

[73] Assignee: Teac Corporation, Tokyo, Japan

[21] Appl. No.: 562,632

[22] Filed: Nov. 27, 1995

Related U.S. Application Data

[62] Division of Ser. No. 110,620, Aug. 20, 1993, Pat. No. 5,521,770.

[30] Foreign Application Priority Data

Aug. 21, 1992 [JP] Japan .................................. 4-223010

[51] Int. Cl.⁶ .......................... G11B 11/00; G11B 21/12
[52] U.S. Cl. .......................... 369/13; 360/75; 360/78.13
[58] Field of Search .................................. 369/13; 360/75, 360/69, 59, 114, 78.13; 318/685, 78.12, 78.04, 78.01

[56] References Cited

U.S. PATENT DOCUMENTS

| 4,783,706 | 11/1988 | Shoji et al. | 360/78 |
| 5,521,770 | 5/1996 | Tamada | 360/75 |

FOREIGN PATENT DOCUMENTS 3-144975  6/1991  Japan .

*Primary Examiner*—Ali Neyzari
*Attorney, Agent, or Firm*—Michael N. Meller

[57] ABSTRACT

A head reads information from and/or records information to a disc. A head driving unit drives the head on a disc in substantially radial direction thereof, the moving being executed in either a first driving manner or a second driving manner different from the first driving manner and the moving of the head effecting seeking of a track formed on the disc. A disc loading detecting unit detects loading of a disc in said disc apparatus. A switching unit switches over a driving manner from one to another among the first and second driving manners, wherein the switching unit selects the first driving manner while a disc is loaded in the disc apparatus and the switching unit selects the second driving manner while a disc is not the in the disc apparatus.

4 Claims, 8 Drawing Sheets

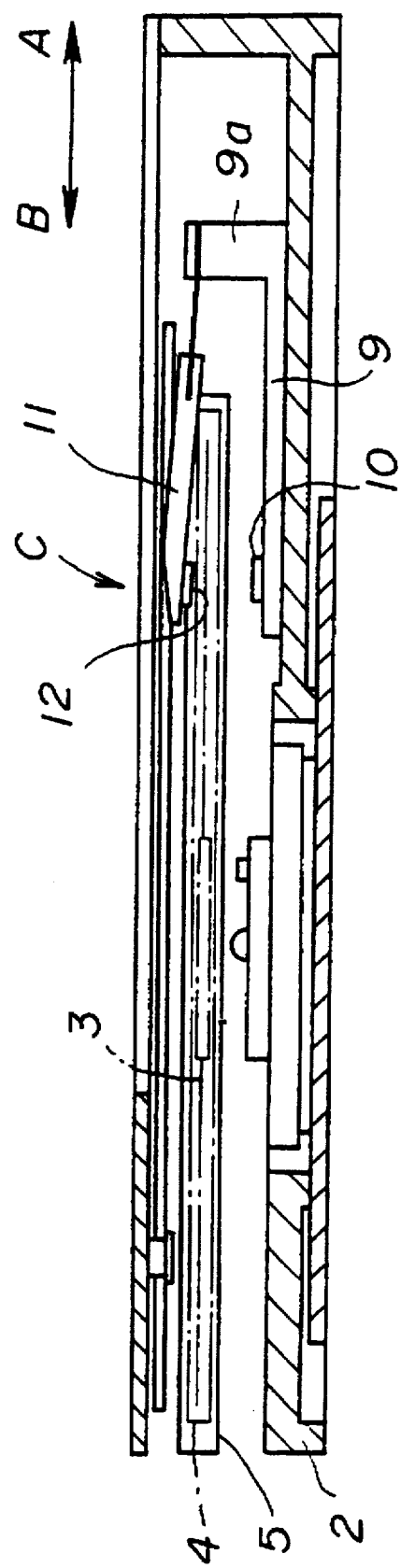

DISC LOADING STATE

DISC UNLOADING STATE

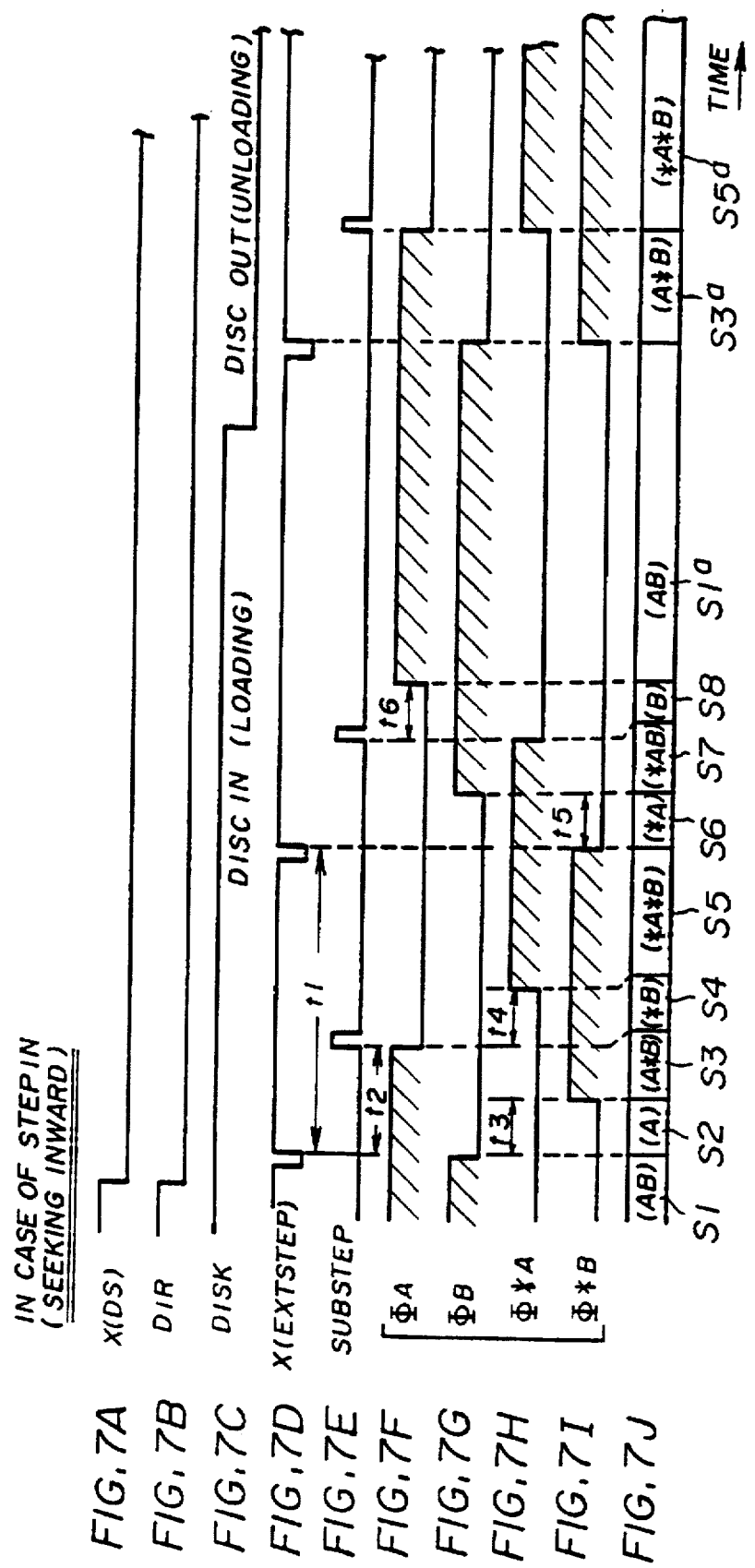

5,687,142

DISC APPARATUS HAVING A PLURALITY OF READING/RECORDING HEAD DRIVING MANNERS FOR DISC TRACK SEEKING MOVEMENT

This is a division of application Ser. No. 08/110620 filed Aug. 20, 1993, Pat. No. 5,521,770.

BACKGROUND OF THE INVENTION

The present invention relates to a disc apparatus, in particular, relates to a disc apparatus for reading information from and/or recording information to a recording medium such as a flexible magnetic disc.

A construction of one example of flexible magnetic disc apparatus (such apparatus will be referred to as simply "magnetic disc apparatus" hereinafter) will now be described with reference to FIGS.1 and 2.

A flexible magnetic disc (this disc will be referred to as simply "disc" hereinafter) 3 is, as known, enclosed in an enclosing case 4. In FIGS.1 and 2, the magnetic disc apparatus 1 has a holder 5 located above a frame 2 thereof. The enclosing case 4 (this case is indicated with chain lines in the figures) will be inserted into the holder 5.

The magnetic disc apparatus 1 has a construction by which, with the known art, the holder 5 will operate as follows. The holder will be lowered, in FIG. 2, in response to the enclosing case 5 being inserted into the magnetic disc apparatus 1. Conversely, the enclosing case 4 will be ejected as a result of the holder 5 being raised. The movements indicated by the terms "lowering" and "raising" are with respect to the directions in FIG. 2, hereinafter.

The magnetic disc apparatus 1 has a known mechanism by which magnetic heads 10 and 12 access the disc 3 in response to the movement of the holder 5. The movement of the holder 5 is the holder 5 being lowered. Conversely, by this mechanism, the magnetic heads 10 and 12 go away from the disc 3 in response to the movement of the holder 5. The movement of the holder 5 is the holder 5 being raised.

The holder 5 has a top plate 5a located on the top thereof. An opening 5b is provided in the top plate 5a into which a below-described magnetic head unit 8 is inserted.

The magnetic head unit 8 has the above-mentioned magnetic heads 10 and 12 which are used to read information from and/or to record information to an information track in the disc 3. A shutter lever 6, having a L-letter like shape, is provided on the top plate 5a. This shutter lever 6 effects opening a shutter (not shown in the figures) provided for on the enclosing case 4 in response to the enclosing case 4 being inserted into the magnetic disc apparatus 1.

This shutter lever 6 is pivotably supported on the top plate 5a. The shutter provided on the enclosing case 4 has the following known features. The shutter effects protecting the disc 3. This shutter has to be opened so as to make the opening on the enclosing case 4. Thus, through the made opening, the magnetic heads 10 and 12 may access the disc 3 enclosed in the enclosing case 4. This accessing by means of the magnetic heads 10 and 12 enables them to read information from and/or to record information to an information track formed on the disc 3.

The shutter lever 6 is always biased, in the clockwise direction in FIG. 1, by means of a coil spring 7 with its pulling force. This biasing in the clockwise direction results in closing, by means of the shutter lever 6, the shutter of the enclosing case 4 when the enclosing case 4 is inserted into the holder 5. An engaging pin 6a projects from the top of the shutter lever 6. This projection of the engaging pin 6a is directed toward into the inside of the holder 5 through an opening 5c having an arc shape. This direction corresponds to that toward the reverse side of the sheet on which FIG. 1 is represented. This engaging pin 6a engages the shutter of the enclosing case 4 so as to open the shutter.

The above-mentioned magnetic head unit 8 has the following construction. The magnetic head unit 8 comprises a carriage 9 which slidably moves in the directions A and B shown in FIG. 1. As shown in FIG.2, the lower magnetic head 10 is mounted on the top surface near the left end of the carriage 9. An arm 11 is up-and-down swingably supported on the right end post 9a of the carriage 9. The upper magnetic head 12 is mounted on the bottom surface of the left end of the arm 11.

The carriage 9 engages with a lead screw (not shown in the figures) which is driven by a stepper motor (not shown in the figures). With this engagement, the carriage may be moved in either the directions A or B in response to the turning of the lead screw. This movement of the carriage 9 enables the magnetic heads 10 and 12 moving on the disc 3 in its radial directions.

The arm 11 is biased in the direction C shown in FIG. 2 by means of a torsion spring 9c, shown in FIG. 1, with its pressing force. This torsion spring 9c is mounted on the post 9a of the carriage 9. An abutting bar 11a projects from the left side of the arm 11 as shown in FIG. 1. This abutting bar 11a abuts-on the top plate 5a of the holder 5. In this construction, when the enclosing case 4 is to be ejected from the magnetic disc apparatus 1 (the state of the magnetic head apparatus 1 in which the enclosing case 4 has been ejected will be referred to as "disc unloading state" hereinafter), the magnetic disc apparatus 1 operates as follows.

Then, as mentioned above, the holder 5 is raised and the enclosing case is thus ejected. The arm 11 is raised upward in FIG. 2 as a result of being pushed by means of the raised holder 5. This pushing the arm 11 is effected through the abutting bar 11a. That is, the top plate 5a of the holder 5 pushes the abutting bar 11a so as to raise the arm 11. Thus, the arm 11 is raised against the reverse-direction pushing force applied by means of the torsion spring 9c. As a result, the upper magnetic head 12 is raised. Thus, the upper magnetic head 12 goes away from the lower magnetic head 10.

The state of the magnetic disc apparatus 1 in which the enclosing case 4 is loaded in the apparatus 1 as a result of the enclosing case 4 having been inserted therein will be referred to as "disc loading state" hereinafter.

When the magnetic disc apparatus 1 moves from the disc unloading state to the disc loading state thereof, the holder 5 is lowered as mentioned above. Thus, the top plate 5a is lowered. As a result, the effect having been performed on the abutting bar 11a by means of the top plate 5a is released accordingly. This effect is to maintain the abutting bar 11a at the raised position thereof. Thus, the arm 11 is lowered by means of the torsion spring 9c with its pushing force. Thus, the upper magnetic head 12 is lowered.

Thus, the upper magnetic head 12 approaches the lower magnetic head 10. As a results, both the upper and lower magnetic heads 10 and 12 together sandwich the disc 3.

Generally speaking, a magnetic disc apparatus for recording information to and/of reading information from a flexible magnetic disc has the following features. In such a magnetic disc apparatus, for example, in the magnetic disc apparatus 1 as mentioned above, the magnetic disc 1 is a recording medium which may be changed by another similar disc. That is, the disc 3 loaded in the magnetic disc apparatus 1 may be replaced by another disc as occasion demands. That is, the disc 3 may be ejected so as to be unloaded from and another disc may be inserted so as to be loaded into the magnetic apparatus 1.

Generally speaking, such a magnetic disc apparatus, for example, the magnetic disc apparatus 1, even in the disc unloading state, may operate as follows. The magnetic disc apparatus 1 executes seeking action according to a corresponding command provided from a host apparatus or a mother apparatus thereof. This seeking action is performed by moving the heads 10 and 12 in the directions which would correspond to radial directions of a disc if the disc were loaded therein. The host apparatus or the mother apparatus comprises for example, a computer utilizing the magnetic disc apparatus 1 as means for recording and/or reading information associated with the computer.

Further, actions executed in a such a magnetic disc apparatus will be referred to as "head loading/unloading action" or "head loading/unloading movement" These actions are respectively those that the heads, in the example, the heads 10 and 12 approach/go away from each other, in directions substantially perpendicular to the information recording surface of the disc 3.

A reason of such seeking action being to be executed even during the disc unloading state will now be described. By moving the heads 10 and 12 prior to the disc 3 being loaded in the magnetic disc apparatus 1, it is possible to generate a condition at a moment the disc 3 is loaded. The condition to be generated is a preparation for a process to be performed on the disc 3 and the condition is that the heads 10 and 12 are on the so-called #00 tracks formed on the disc 3. Such generating of a condition as a preparation for a process to be performed on a disc is, in other word, initializing of the heads. Such initialization of the heads being executed before the disc is loaded in the magnetic disc apparatus enables the host apparatus to execute the process of using the magnetic disc apparatus with the disc without any delay time or idling time.

Such seeking action being executed in its disc unloading state needs the following operation in the magnetic disc apparatus 1. As mentioned above, the upper magnetic head 12 is raised when the disc 3 is being ejected. For this purpose, the abutting bar 11a of the arm 11 is pushed upward by means of the top plate 5a of the holder 5. Thus, this condition is maintained during its disc unloading state. That is, in this condition, the abutting bar 11a is pushed upward by means of the top plate 5a.

The above-mentioned seeking action by the heads 10 and 13, which are the parts of the magnetic head unit 8, has to be executed in this condition. Thus, the magnetic head unit 8 has to move in this condition. That is, the abutting bar 11a, which is the part of the magnetic head unit 8 as mentioned above, has to slide on the top plate 5a which pushes the abutting bar 11a. As a result, considerable friction occurs between the abutting bar 11a and the top plate 5a during this seeking action. The friction force in this friction occurring corresponds to the pushing force resulting from the pushing of the abutting bar 11a by means of the top plate 5a.

This pushing of the abutting bar 11a by means of the top plate 5a is executed in the disc unloading state but is not executed in the disc loading state. Thus, an extra force is needed to execute the seeking action in the disc unloading state in comparison to that in the disc loading state. To provide this extra force, the stepper motor needs extra capacity in driving the magnetic head unit 8. This extra capacity in the stepper motor is not needed in the seeking action in the disc loading state. This extra capacity in the stepper motor may generally raise an electric power consumption amount in driving the stepper motor and may raise a noise level in this driving, unnecessarily.

SUMMARY OF THE INVENTION

The object of the present invention is to provide a disc apparatus in which power consumption and noise involved in its seeking action in its disc loading state may be reduced.

To achieve the object of the present invention, a disc apparatus according to the present invention comprises:

- at least one head for reading information from and/or recording information to a disc;
- head driving means for driving said head on a disc in a substantially radial direction thereof, the moving being executed in either a first driving manner or a second driving manner different from said first driving manner and the moving of said head effecting seeking a track formed on the disc;
- disc loading detecting means for detecting loading of a disc in said disc apparatus; and
- switching means for switching over a driving manner from one to another among said first and second driving manners, wherein said switching means selects said first driving manner while a disc is loaded in said disc apparatus and said switching means selects said second driving manner while a disc is not loaded in said disc apparatus.

In this construction, it is possible to switch over the driving manner so as to reduce the driving force by means of the head driving means to be an appropriate amount in its disc loading state. Thus, it is possible to reduce amounts of power consumption and noise to be appropriate ones accordingly in the disc loading state.

Other objects and further features of the present invention will become more apparent from the following detailed description when read in conjunction with the accompanying drawings.

BRIEF DESCRIPTION OF THE DRAWINGS

FIG. 2 shows schematic side sectional view of the apparatus shown in FIG. 1;

FIGS. 7A–7J show signal-wave-form time charts associated with the apparatus shown in FIG. 6.

DESCRIPTION OF THE PREFERRED EMBODIMENTS

Figure 3A:
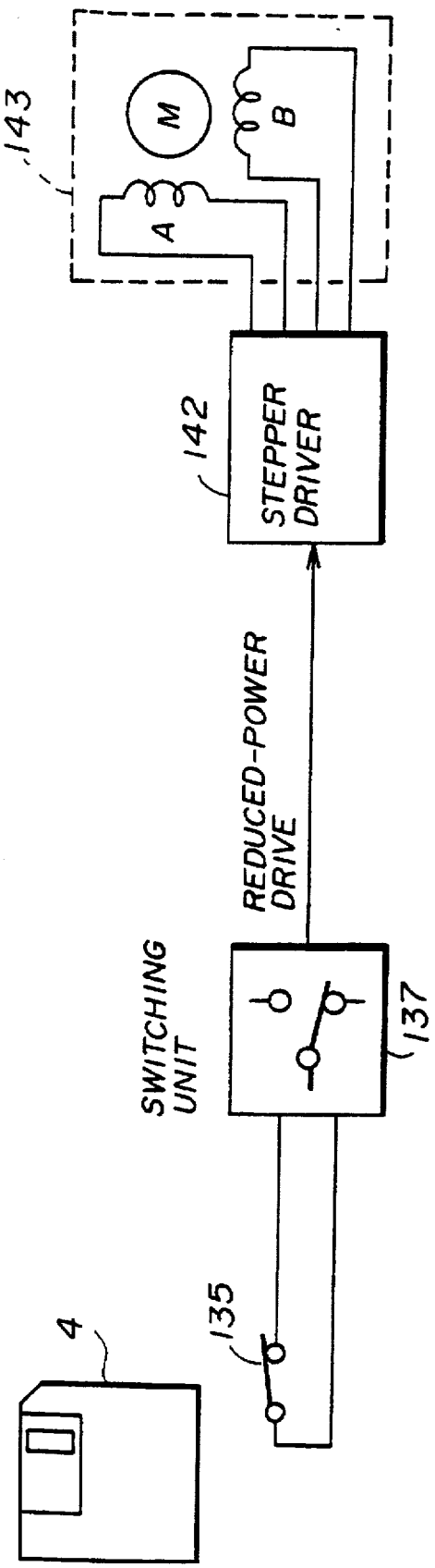
FIG. 3A shows schematic block diagram of part of the magnetic disc apparatus according to the first embodiment, relevant to the present invention, in its disc loading state.
Figure 3B:
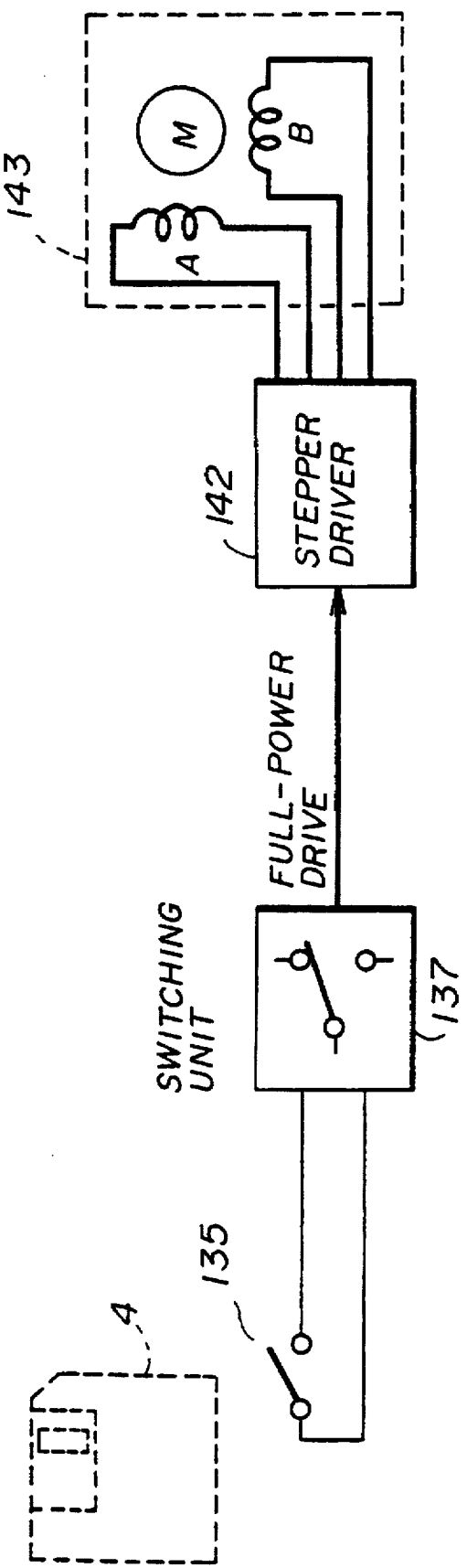
FIG. 3B shows schematic block diagram of part of the magnetic disc apparatus according to the first embodiment, relevant to the present invention, in its disc unloading state.

A magnetic disc apparatus 100 according to the first embodiment of the present invention will now be generally described with reference to FIGS. 3A and 3B.

Figure 1:
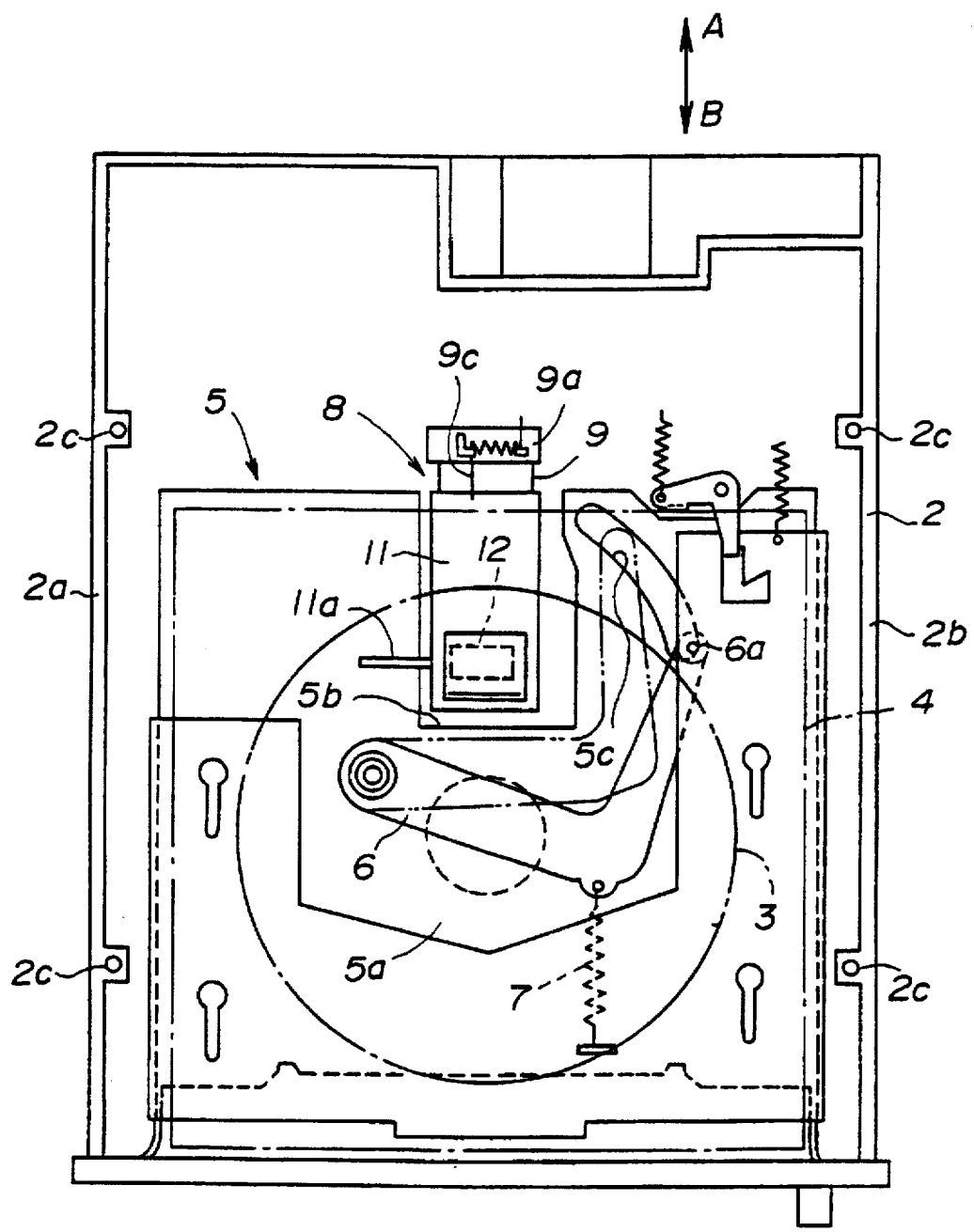
FIG. 1 shows schematic plan construction view of the example of a magnetic disc apparatus and a magnetic disc apparatus according to first to third embodiments of the present invention.

The general mechanical construction of the magnetic disc apparatus is substantially the same as that of the example of the magnetic disc apparatus 1 described above with reference to FIGS.1 and 2. Thus, such a description will be omitted.

This magnetic disc apparatus 100 comprises a disc detection unit 135, a switching unit 137, a stepper driver 142, and a stepper motor 143. The stepper motor 143 effects to drive the magnetic heads and 12 so as to bring the heads 10 and 12 to desired information tracks formed on the disc 3. This driving of the magnetic heads 10 and 12 corresponds to the above-mentioned seeking action.

The stepper driver 142 effects control of this function effected by means of the stepper motor 143. The switching unit 137 effects switching over a driving manner from one to another among a predetermined plurality of driving manners. In this embodiment, the predetermined plurality of driving manners comprise two different driving manners: the first driving manner and the second driving manner. In either the first driving manner or the second driving manner, the stepper driver 142 controls the seeking action performed by means of the stepper motor 143.

The disc detection unit 135 effects determining whether or not an enclosing case 4 enclosing a disc 3 is loaded in the magnetic disc apparatus 100. The open/close switch 135 in FIGS. 3A and 3B closes in the disc loading state and opens in the disc unloading state.

The switching unit 137 may switch over the driving manner in response to the change in the state between the disc loading state and the disc unloading state, as the result of the detection performed by means of the disc detection unit 135.

An operation performed in the magnetic disc apparatus 100 will now be described.

When the enclosing case 4 is inserted in to the magnetic disc apparatus 100 so that the disc 3 is loaded in the apparatus 100, the apparatus 100 operates as follows. As shown in FIG. 3A, the disc detection unit 135 detects the enclosing case 4 has been inserted. Thus, the switch 135 in FIG. 3A closes. As a result, the switching unit 137 switches over the driving manner so as to select the first driving manner.

This first driving manner comprises a reduced power driving mode. In this reduced power driving mode, the stepper driver 142 controls the stepper motor 143 so as to cause the motor 143 to drive the magnetic head unit 8 having heads 10 and 12 with a predetermined reduced driving power.

When the enclosing case 4 is ejected from the magnetic disc apparatus 100 so that the disc 3 is unloaded from the apparatus 100, the apparatus 100 operates as follows. As shown in FIG. 3B, the disc detection unit 135 detects the enclosing case 4 has been ejected. Thus, the switch 135 in FIG. 3A opens. As a result, the switching unit 137 switches over the driving manner so as to select the second driving manner.

This second driving manner comprises a full power driving mode. In this full power driving mode, the stepper driver 142 controls the stepper motor 143 so as to cause the motor 143 to drive the magnetic head unit 8 having heads 10 and 12 with a full driving power without any reduction of the driving power.

Thus, in the magnetic disc apparatus 100, the driving force with which the stepper motor 143 drives the magnetic head unit 8 is reduced in the disc loading state. Thus, unnecessary excessive driving force may be prevented from being applied to the magnetic head unit 8 in the disc loading state. Thus, the power consumption and the noise is reduced accordingly in the disc loading state.

Figure 4:
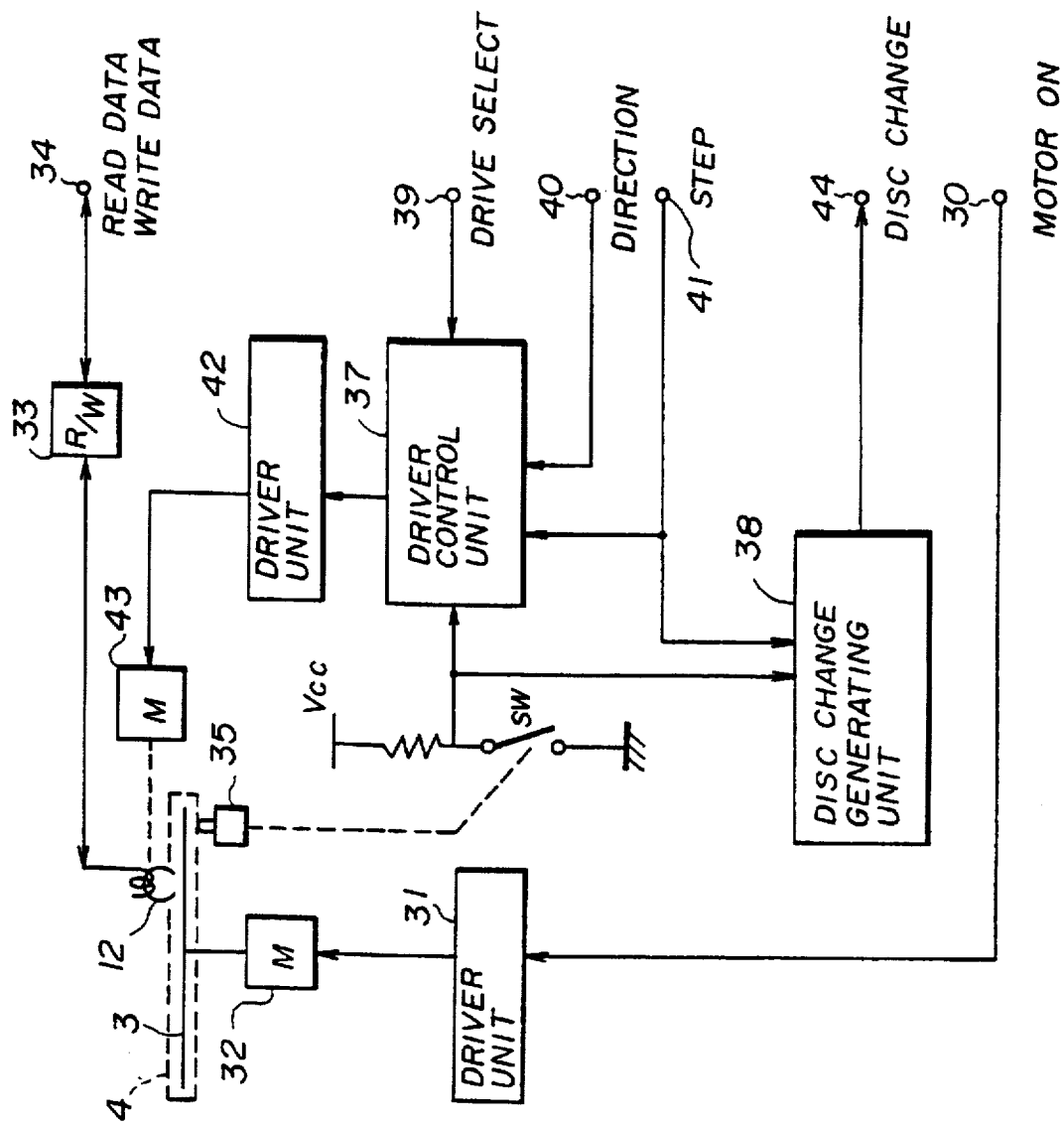
FIG. 4 shows schematic block diagram of part of the magnetic disc apparatus according to the second embodiment, relevant to the present invention.

The magnetic disc apparatus 200 according to the present invention will now be described with reference to FIG. 4.

The general mechanical construction of the magnetic disc apparatus 200 is substantially the same as that of the example of the magnetic disc apparatus 1 described above with reference to FIGS.1 and 2. Thus, such a description will be omitted.

A motor-on signal which has been provided from the host apparatus may be input at a terminal 30. In this case, a driver unit 31 causes a spindle motor 32 to run. As a result, a magnetic disc 3 is turned by means of the spindle motor 32. In this condition, the magnetic head 12 may read information from and/or record information to the magnetic disc 3.

A read/write unit 33 supports the reading/recording performed through the magnetic head 12. The read/write unit 33 is connected with the host apparatus through a read/write terminal 34. (Actually, the read/write terminal comprises a read terminal and a write terminal separately.)

A mechanical switch 35 effects detecting whether or not an enclosing case 4 is loaded in the magnetic disc 200. When the enclosing case 4 is loaded in the apparatus 200, the mechanical switch 35 operates accordingly. This operation of the mechanical switch 35 results in opening of a switch SW linked with the mechanical switch 35. As a result, a disc-in sensor signal having a logical H level is generated.

Conversely, when the enclosing case 4 is ejected from the apparatus 200, the mechanical switch 35 operates accordingly. This operation of the mechanical switch 35 results in closing of the switch SW. As a result, a disc-in sensor signal having a logical L level is generated.

Both the H and L level signals are provided to the disc change generating unit 38.

The following signals are respectively provided to the a driver control unit 37 from the host apparatus through terminals 39–41. These signals comprise a drive select signal, a direction signal and a step signal. The drive select signal indicates that the user selects this magnetic disc apparatus 200 from among a plurality of similar information recording means belonging to the common host apparatus. As a result of receiving the drive select signal, the magnetic disc apparatus 200 enters in its condition where the host apparatus may control the magnetic disc apparatus 200.

The direction signal indicates a direction for the seeking movement, that is, a direction in which the magnetic heads move and the direction signal indicates either the outward direction of the radial directions of the disc 3 or the inward direction of the radial directions of the disc 3. The step signal indicates that the host apparatus intends the magnetic disc apparatus 200 to execute a seeking action such as mentioned above. In this seeking action, the magnetic head 12 moves on the disc 3 so as to seek a desired information track formed on the disc 3. The step signal may comprise one pulse so as to move the head 12 located on the disc 3 by a width corresponding to one track formed on the disc 3.

The driver control unit 37 generates, in accordance with the three kinds of signal and the above-mentioned disc-in sensor signal, a driving signal for causing the stepper motor 43 to run.

A driver unit 42 provides, in accordance with the driving signal provided by the driver control unit 37, driving electric current to the stepper motor 43. This driving electric current directly drives the stepper motor 43.

The running of the stepper motor 43 effects to move the magnetic head 12 in the radial direction of the disc 3. That is, the seeking action is executed.

The disc change generating unit 38 outputs a predetermined disc change signal as a result of receiving the above-mentioned disc-in sensor signal, as follows. Since the state was changed from the disc loading state to the disc unloading state, the disc generating unit 38 keeps outputting a first predetermined disc change signal to the host apparatus through a terminal 44.

In this condition, that is, in the disc unloading state, the disc-in sensor signal has a logical L level as mentioned above. When the host apparatus receives this first predetermined disc change signal, the host apparatus recognizes that the enclosing case 4 is not loaded in the magnetic disc apparatus 200.

Then, after the enclosing case 4 has been loaded in the magnetic disc apparatus 200, the following operation is executed. The logical level associated with the disc-in sensor signal becomes a logical H level accordingly as mentioned above. The disc change generating unit 38 then outputs a second predetermined disc change signal by the following steps. First the unit 38 receives the disc-in sensor signal which has become the logical H level as mentioned above. Second the unit 38 receives the step signal through the terminal 41.

The host apparatus recognizes, by receiving the second predetermined disc change signal, that the enclosing case 4 is loaded in the magnetic disc apparatus 200.

Part of the above-mentioned driver control unit 37 will now be described with reference to FIG. 5.

Figure 5:
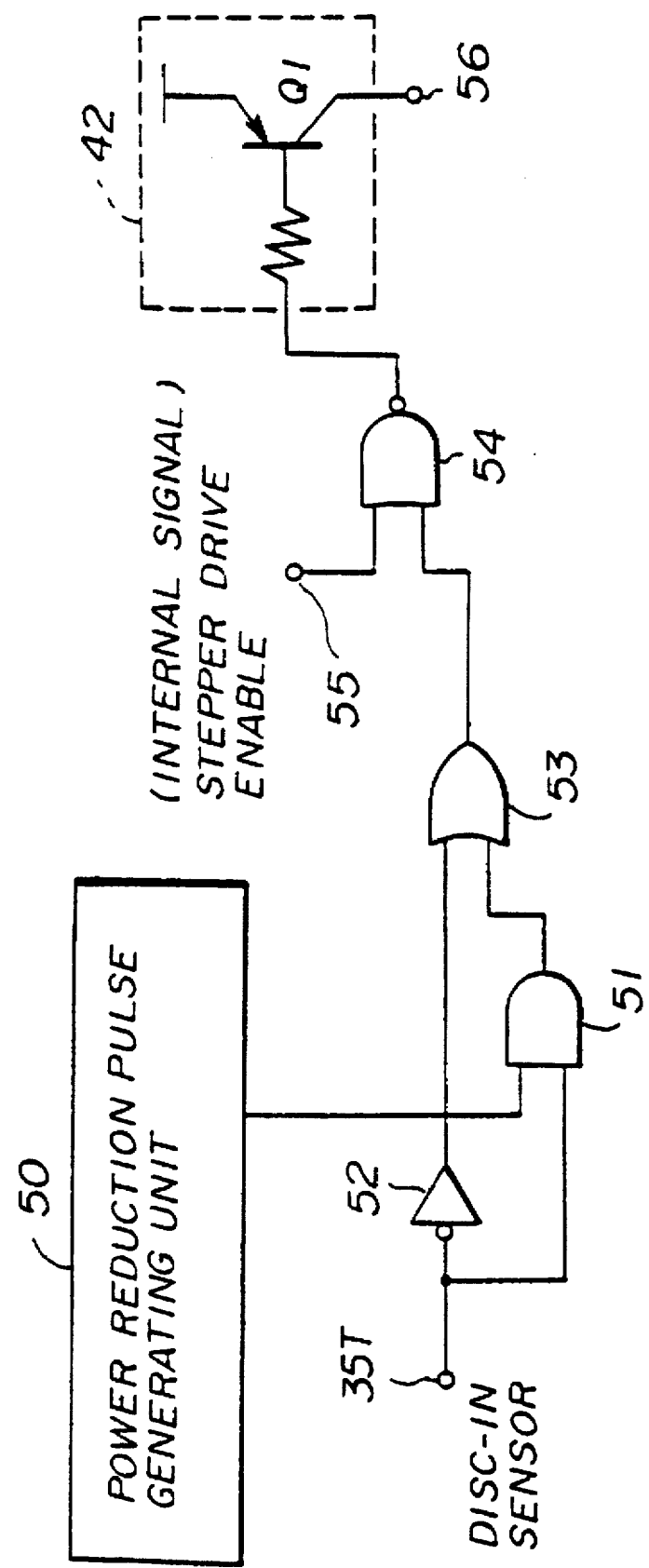
FIG. 5 shows schematic circuit diagram of part of a driver control unit in the magnetic disc apparatus according to the second embodiment, relevant to the present invention.

In FIG. 5, a power-reduction pulse generating unit 50 generates a pulse signal. This pulse signal effects to substantially reduce, in the disc loading state, the driving power with which the stepper motor 43 drives the head 12. That is, for example, a duty ratio in this pulse signal may be 50%.

The term "duty ratio" means a percentage of the entire time, during which the signal level is H. Thus, the duty ratio of 50% means that first time while the signal level is H and second time while the signal level is L alternate periodically where the first time has the same interval as that of the second time.

The driving force with which the stepper motor 43 drives the head 12 is either applied or cut off in response to either the level H or the level L of the pulse signal generated by the power-reduction pulse generating unit 50. That is, the generated signal having the level H results in the predetermined driving force being applied to the head 12 and the level L results in no driving force being applied thereto.

As a result of averaging the effect during the period of the level H and the effect in the other period of the level L, this condition is substantially equivalent to that in which the half of the predetermined driving force is always applied to the head 12. This is because, in the 50% duty ratio, the interval while the predetermined force is applied and the other interval while no force is applied are the same.

Further, in the disc unloading state, the predetermined driving force is always applied to the head 12 by means of the stepper motor 43.

By the above-mentioned function, the driving force to be applied to the head 12 by means of the stepper motor 43 may be controlled as follows. The driving force is selected to become the predetermined force in the disc unloaded state and the driving force is selected to become a driving force resulting from desirably reducing the predetermined force. The percentage of the reduced driving force in the predetermined force may be desirably selected by changing the duty ratio in the pulse signal generated by the power-reduction pulse generating unit 50.

This power-reduction pulse generating unit 50 has, for example, the following composition. A disc apparatus such as the magnetic disc apparatus 200 includes an internal-clock-signal generating mechanism for generating an internal clock signal to be used for known processes executed in the disc apparatus.

Such an internal clock signal may be utilized for generating the pulse signal to be generated by the power-reduction pulse generating unit 50. That is, frequency dividing may be performed on clock pulses associated with the internal clock signal. As a result of the frequency division, for example, a pulse signal having its pulse period of 40µs, that is, having its pulse frequency of 25kHz may be obtained. This pulse frequency corresponds to non-audio frequency. Thus, this obtained pulse signal may be provided, as the above-mentioned pulse signal to be generated by the power-reduction pulse generating unit 50, to a logical AND device 51.

As shown in FIG. 5, not only such a pulse signal but also the disc-in sensor signal, input through a terminal 35T, are provided to the logical AND device 51. Output provided from the logical AND device 51 is then provided to a logical OR device 53. Further, a signal resulting from inverting the disc-in sensor signal by means of an inverter 52 is also provided to the logical OR device 53. Output provided from the logical OR device 53 is then provided to the logical NAND device 54 together with a stepper drive enable signal.

This stepper drive enable signal is an internal signal in the magnetic disc apparatus 200. This stepper drive enable signal is generated in the driver control unit 37 in another part not shown in FIG. 5. This generation of the stepper drive enable signal is executed in accordance with the above-mentioned drive select signal and step signal.

This stepper drive enable signal has a logical level H where the following two conditions are simultaneously fulfilled. The first condition is that the drive select signal indicates the magnetic disc apparatus 200 is selected. The second condition is that the step signal indicates the seeking action to be executed. (It should be noted that such a step signal which initiates the generating of the step drive enable signal comprises an internal step signal and an external step signal. The external step signal is provided, for example, from the host computer and the internal step signal is formed based on the external signal by such a device as an internal step generation unit 61 shown in FIG. 6 to be described below. This is because, the host computer merely provides one pulse as the external step signal to make the head move by one track on the disc while the disc apparatus needs two pulses to cause the head to move by one track. Thus, one additional pulse is provided as the internal step signal for each pulse provided as the external step signal so as to provide two pulses to cause the head to move by one track.) The logical level H in the stepper drive enable signal thus means the host apparatus intends the magnetic disc apparatus 200 to perform a certain seeking action.

An operation executed in the composition shown in FIG. 5 will now be described.

In the disc unloading state, the disc-in sensor signal has a logical L signal as mentioned above. This disc-in sensor signal is inverted in its logical level by means of the inverter 52 so that logical level in the disc-in sensor signal becomes H. Then, the logical OR device 53 provides a logical H level signal irrespective of a signal provided by the logical AND device 51.

In this condition, the logical NAND device 54 provides a logical L level signal while the stepper drive enable signal having a logical H level is provided. In this case, a transistor $Q_1$ in a driver unit 42 turns on. This turn-on condition in the transistor $Q_1$ is maintained without regarding the pulse signal provided from the power-reduction pulse generating unit 50. This is because the logical AND device 51 effects closing the gate function thereof as a result of the logical L level in the disc-in sensor signal provided thereto. Thus, a predetermined driving electric current is constantly supplied to the stepper motor 43 by means of the turning-on transistor $Q_1$ via a terminal 56. Thus, the stepper motor 43 drives the magnetic head 12 with the corresponding constant predetermined driving force.

In the disc loading state, the disc-in sensor signal has a logical H level as mentioned above. Thus, the L level signal, resulting from inverting this H level signal by means of the inverter 52, is provided to the input terminal of the logical OR device 53. Then, output provided from the logical OR device 53 becomes identical to that provided from the logical AND device 51. That is, the gate function of the logical OR device 53 opens for passing the output provided from the logical AND device 51 therethrough.

Further, the logical H level of the disc-in sensor is provided to the logical AND device 51. Thus, output provided by the logical AND device 51 becomes identical to that provided by the power-reduction pulse generating unit 50. Thus, the gate function of the logical AND device 51 opens for passing the output provided from the unit 50 therethrough.

Thus, the pulse signal provided by the power-reduction pulse generating unit 50 passes through the logical AND device 51 and then passes through the logical OR device 53. In this condition, output provided from the logical NAND device 54 becomes a signal having a logical level resulting from inverting the output provided by the logical OR device 53 while the stepper drive enable signal has a logical H level.

That is, the output provided from the logical NAND device 54 becomes a signal resulting from inverting, in its level, the pulse signal provided by the power-reduction pulse generating unit 50. Thus, a state in the transistor $Q_1$ receiving this output provided by the logical NAND device 54 is different between its turning on state and its turning off state in response to the difference of logical level of this pulse signal between L and H.

Thus, the transistor $Q_1$ alternates allowing and not allowing periodically the predetermined driving current being supplied to the stepper motor 43 via the terminal 56 accordingly. Thus, the stepper motor 43 drives the magnetic head 12 with the periodically alternated driving power between the predetermined force and zero force (no power). Thus, the stepper motor 43 substantially drives the head 12 with a constant driving power having an amount resulting from reducing the predetermined power in a rate corresponding to the duty ratio in the pulse signal provided by the power-reduction pulse generating unit 50.

By adjusting the duty ratio in the pulse signal, an appropriate amount of, that is, not an unnecessarily great amount of the driving force may be applied to the head 12 even in the disc loading state. Thus, the power consumption and the noise may be reduced accordingly.

In the circuit construction shown in FIG. 5, it may be preferable to provide smoothing means so as to eliminate undesirable effects caused by the pulse signal being used for driving the stepper motor 43. This undesirable effects may comprise audio noise and/or electrical noise occurring as a result of the violently alternated change in running conditions of the stepper motor.

For this purpose, a smoothing capacitor may be inserted between the terminal 56 and the ground. As a result, the pulse like driving current provided to the stepper motor 43 is smoothed. Thus, the following possibilities may be eliminated. A possibility of occurrence of such audio noise may be eliminated and a possibility of interference caused by such electrical noise may be eliminated. This influence may affect other apparatus associated with magnetic disc apparatus 200. Thus, reliability of the magnetic disc apparatus 200 may be improved.

The magnetic disc apparatus 300 according to the third embodiment of the present invention will now be described with reference to FIG. 6.

The general mechanical construction of the magnetic disc apparatus 300 is substantially the same as that of the example of the magnetic disc apparatus 1 described above with reference to FIGS.1 and 2. Thus, such a description will be omitted.

The magnetic disc apparatus 300 has a driver control unit 37, a driver unit 42 and a stepper motor 43.

Figure 6:
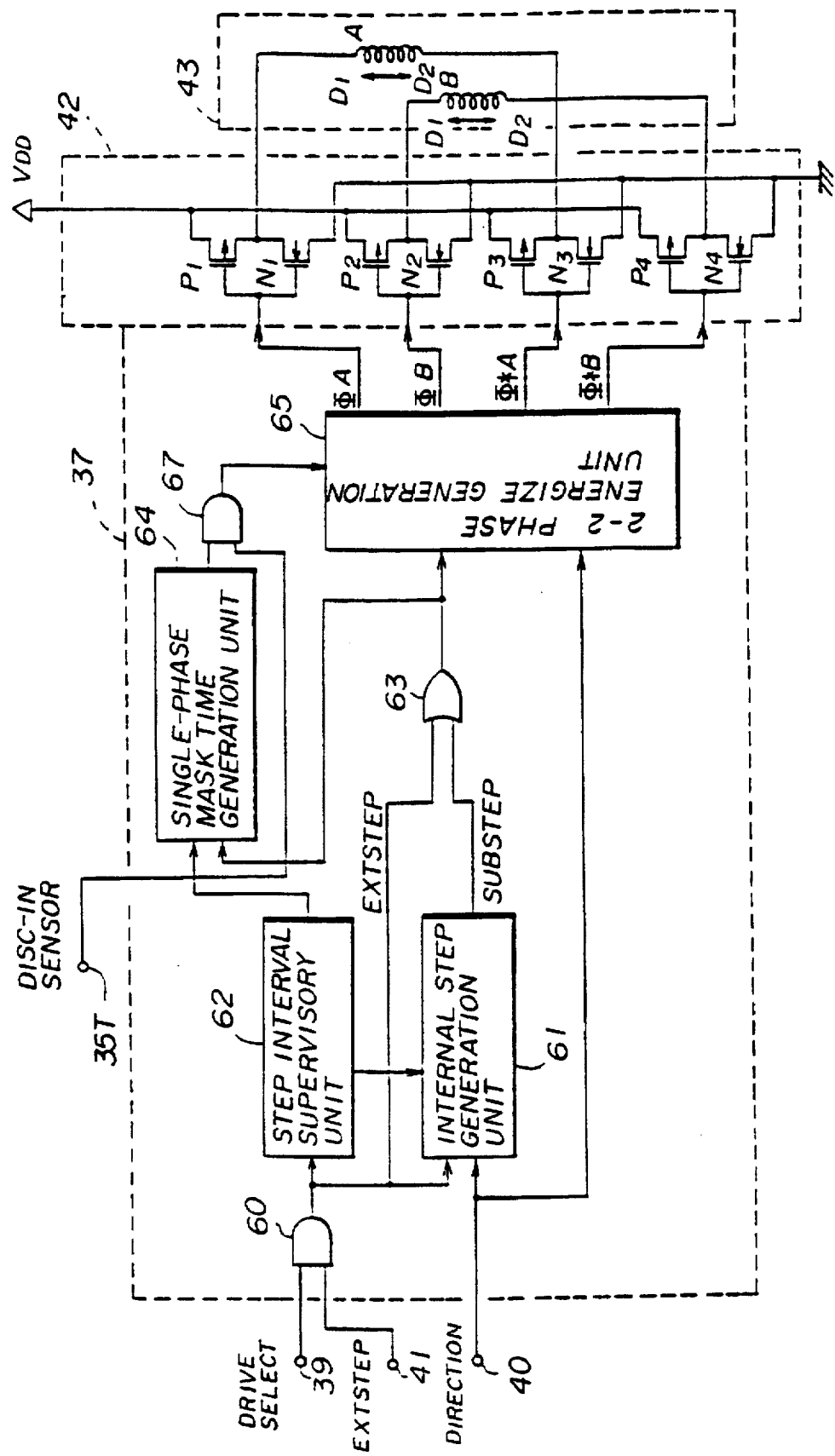
FIG. 6 shows schematic circuit diagram of part of the magnetic disc apparatus according to the third embodiment, relevant to the present invention.

In FIG. 6, a drive select signal DS and a step signal EXTSTEP are respectively provided, via terminals 39 and 41, to a logical AND device 60. These drive select signal DS and step signal EXTSTEP respectively act similarly to the drive select signal and step signal described with reference to FIG. 4.

The step signal EXTSTEP may pass through the logical AND device 60 only while the drive select signal DS having a logical H level is provided to the logical AND device 60. This passing through step signal EXTSTEP is then provided to an internal step generation unit 61, a step interval supervisory unit 62 and a logical OR device 63 respectively. FIGS.7A and 7D respectively show wave forms X(DS) and X(EXTSTEP). These wave forms X(DS) and X(EXTSTEP) are respectively obtained by respectively inverting the wave form of drive select signal DS and the wave form of the step signal EXTSTEP.

(However, these inverted signals X(DS) and X(EXTSTEP) are not shown to be used in FIG. 6. For example, in FIG. 6, these inverted signals X(DS) and X(EXTSTEP) may be again inverted prior to input at the terminals 41 and 39. Generally speaking, such inverted signals are frequently used in such a magnetic disc apparatus. FIG. 6 illustrates a signal flow as one example according to the third embodiment of the present invention. Thus, a person skilled in the art may easily modify the composition shown in FIG. 6 so as to make a composition according to the third embodiment of the present invention which composition directly uses such inverted signals X(EXTSTEP) and X(DS). )

Further, a direction signal DIR shown in FIG. 7B is provided, via a terminal 40, to the internal step generation unit 61. This direction signal DIR acts similarly to that described with reference to FIG. 4.

The stepper motor 43 has to turn, in response to the step signal EXTSTEP provided to the driver control unit 37, as follows. The stepper motor 43 drives the magnetic heads 10 and 12 so as to perform a seeking action such as mentioned above. In this seeking action, the magnetic heads 10 and 12 respectively move on the information recording surface of the disc 3 by a width corresponding to one information track in response to one step pulses of the step signal EXTSTEP being provided. (As shown in FIG. 7D, an interval between such two step pulses is a time t1.)

To make the stepper motor 43 achieve such a seeking action by means of the magnetic heads 10 and 12, the internal step generation unit 61 operates as follows. The unit 61 generates a substep signal SUBSTEP which is obtained by delaying by a time t2 the step signal EXTSTEP passing through the logical AND device 60. This substep signal SUBSTEP has a wave form shown in FIG. 7E.

The step signal EXTSTEP passing through the logical AND device 60 and the substep signal SUBSTEP are respectively provided to the logical OR device The logical OR device 63 then provides an output signal to a signal-phase mask time generation unit 64 and a 2-2 phase energize generation unit 65. This output signal has been obtained as a result of the logical device 63 performing the logical OR function on the input signals EXTSTEP and SUBSTEP therein.

The step interval supervisory unit 62 controls the internal step generation unit 61 in response to the time interval t1 between step pulses associated with the step signal EXTSTEP. As a result, the unit 61 appropriately generates the step pulses associated with the step signal EXTSTEP.

Further, the step interval supervisory unit 62 controls the single-phase mask time generation unit 64. Thus, the signal-phase mask time generation unit 64 generates a mask signal in an appropriate timing. This mask signal is used for masking below-mentioned switching signals appropriately. In this mask signal, the signal level is a logical H level during a time the switching signals is to be masked.

A gate function is performed on this mask signal through a logical AND device 67. That is, while a disc-in sensor signal has a logical H level, that is, in a disc loading state such as mentioned above, the mask signal may pass through the logical AND device 67. The disc-in sensor signal is shown in FIG. 7C and is provided via a terminal 35T. This passing through mask signal is then provided to the 2-2 phase energize generation unit 65.

The 2-2 phase energize generation unit 65 effects generating switching signals ΦA, ΦB, Φ*A, 101 *B respectively shown in FIGS.7F–7I. FIG. 7F–7I show signal wave forms in a case where the magnetic heads 10 and 12 are respectively to perform a seeking action in a step-in condition in which the heads 10 and 12 respectively moves inward on the disc 3.

There may be another case where the magnetic heads 10 and 12 are respectively to perform a seeking action in a step-out condition in which the heads 10 and 12 respectively moves outward on the disc 3. In this other case, in the disc loading state, below-described steps are to be executed backwardly to a sequence of steps S1–S8 (the term "step" will be omitted so that, for example, a "step S1" will be replaced by simply "S1", hereinafter), that is, a sequence of steps in the other case is to be as follows: S8, then S7, then S6, then S5, then S4, then S3, then S2 and then S1. Similarly, in this other case, in the disc unloading state, a sequence of steps is to be S7$^a$ then S5$^a$ then S3$^a$ and then S1$^a$. (This sequence in steps is the reverse of that, that is S1$^a$then S3$^a$, then S5$^a$ and then S7$^a$ (even though the step S7$^a$ is not shown in FIG. 7J) in the disc loading state as shown in FIG. 7J.)

The 2-2 phase energize generation unit 65 operates, in accordance with the provided signals, that is, the output from the logical OR device 63 and the direction signal DIR, as mentioned below. Further, the 2-2 phase energize generation unit 65 appropriately masks the above four kinds of switching signals ΦA, ΦB, Φ*A, Φ*B respectively. Time corresponding to S1–S8 shown in FIG. 7F–7I show the results obtained by such masking.

The mask signal provided by the logical AND device 67 has a logical H level for each time interval of time intervals t3, t4, t5 and t6. During these time intervals the following masking function is performed. During the time interval t3 (S2), the switching signal Φ*B becomes a logical L level as a result of the masking function. During this time interval t3, the switching signal Φ*B should be a logical level H if the masking function was not performed.

During the time interval t4 (S4), the switching signal Φ*A becomes a logical L level as a result of the masking function. During this time interval t4, the switching signal Φ*A should be a logical level H if the masking function was not performed.

During the time interval t5 (S6), the switching signal ΦB becomes a logical L level as a result of the masking function. During this time interval t5, the switching signal ΦB should be a logical level H if the masking function was not performed.

During the time interval t6 (S8), the switching signal ΦA becomes a logical L level as a result of the masking function. During this time interval t6, the switching signal ΦA should be a logical level H if the masking function was not performed.

FIG. 7J shows a name of a switching signal which is in a logical in each step.

The four kinds of switching signals ΦA, ΦB, Φ*A, Φ*B are respectively provided to field effect transistors (they will be referred to as "FETs" hereinafter) in a driver unit 42 as shown in FIG. 6.

The switching signal ΦA is provided to the gates of P-channel FET P1 and N-channel FET N1 respectively. The switching signal ΦB is provided to the gates of P-channel FET P2 and N-channel FET N2 respectively. The switching signal Φ*A is provided to the gates of P-channel FET P3 and N-channel FET N3 respectively. The switching signal Φ*B is provided to the gates of P-channel FET P4 and N-channel FET N4 respectively.

The sources of the FETs P1–P4 are respectively connected with the power source $V_{DD}$. The sources of the FETs N1–N4 are respectively grounded.

The drains of the FETs P1 and N1 are respectively connected with one end of a coil A of the stepper motor 43 while the drains of the FETs P3 and N3 are respectively connected with the other end of a coil A of the stepper motor 43. The drains of the FETs P2 and N2 are respectively connected with one end of a coil B of the stepper motor 43 while the drains of the FETs P4 and N4 are respectively connected with the other end of a coil B of the stepper motor 43.

In this connection, the FETs P1 and N3 respectively turn on while the switching signal ΦA is in a logical L level and the switching signal Φ*A is in a logical H level. As a result, a driving current flows from the FET P1 to FET N3 through the coil A. That is, in FIG. 6, a driving current flows in the coil A in a direction D2.

By such an operation as mentioned above, the stepper motor 43 having the known construction with the coils A and B is driven with the known driving mechanism.

The FETs N1 and P3 respectively turn on while the switching signal ΦA are in a logical H level and the switching signal Φ*A is in a logical L level. As a result, a driving current flows from the FET P3 to FET N1 through the coil A. That is, in FIG. 6, a driving current flows in the coil A in a direction D1.

By such an operation, the stepper motor 43 is driven.

The FETs P2 and N4 respectively turn on while the switching signal ΦB are in a logical L level and the switching signal Φ*B is in a logical H level. As a result, a driving current flows from the FET P2 to FET N4 through the coil B. That is, in FIG. 6, a driving current flows in the coil B in a direction D2.

By such an operation, the stepper motor 43 is driven.

The FETs N2 and P4 respectively turn on while the switching signal ΦB are in a logical H level and the switching signal Φ*B is in a logical L level. As a result, a driving current flows from the FET N2 to FET P4 through the coil B. That is, in FIG. 6, a driving current flows in the coil B in a direction D1.

By such an operation, the stepper motor 43 is driven.

As mentioned above, the above-mentioned masking signal is not provided in the disc unloading state as a result of the gate function of the logical AND device 67. Thus, in the disc unloading state, the following switching signals are provided by the 2-2 phase energize generating unit 65.

That is, in these switching signals, while the magnetic heads 10 and 12 respectively move on the disc 3 by a width corresponding to two tracks, switching signals having logical H levels may change as follows: (ΦA, ΦB) (S1), then (ΦA,Φ*B) (S3), then (Φ*A, Φ*B) (S5), then (Φ*A,ΦB) (S7), and then (ΦA, ΦB) (S1ª). As mentioned above, in the step-out condition, the above sequence is to be reversed so that ( ΦA , ΦB) (S1), then (Φ*A,ΦB) (S7), then (Φ*A, Φ*B) (S5), then (ΦA,Φ*B) (S3), and then (ΦA, ΦB) (S1ª).

(Here, the above mentioned cycle for the magnetic heads 10 and 12 respectively moving on the disc 3 by a width corresponding to two tracks, is not limited to result from one rotation of the stepper motor 43. This cycle may result from ⅓ rotation of the stepper motor 43 or may result from ¼ rotation thereof.)

On the other hand, in the disc loading state, in the switching signals, while the magnetic heads 10 and 12 respectively move on the disc 3 by a width corresponding to two tracks, switching signals having logical H levels may change, as a result of a corresponding masking function such as mentioned above, as follows as shown in FIG. 7J: (ΦA, ΦB) (S1), then (ΦA) (S2), then (ΦA, Φ*B) (S3), then (ΦB) (S4), then (Φ*A, Φ*B) (S5), then (Φ*A) (S6), then (Φ*A, ΦB) (S7), then (ΦB) (S8), and then (ΦA,ΦB) (S1ª).

Here, by the masking function, A back part of (ΦA, ΦB) (S1) has been masked so as to make (ΦA)(S2); a back part of (ΦA , Φ*B) (S3) has been masked so as to make (Φ*B)(S4); a back part of (ΦA, Φ*B) (S5) has been masked so as to make (Φ*A)(S6); and a back part of (Φ*A, ΦB) (S7) has been masked so as to make (ΦB)(S8).

As mentioned above, in the step-out condition, the above sequence is to be reversed so that (ΦA, ΦB) (S1), then (ΦB) (S8), then (Φ*A,ΦB) (S7), then (Φ*A) (S6), then (Φ*A, Φ*B) (S5), then (ΦB) (S4), then (ΦA,Φ*B) (S3), then (ΦA) (S2), and then (ΦA,ΦB) (S1ª).

By such masking function, by which the back part of each step may be changed as mentioned above, driving of the stepper motor 43 may become relatively smoothed in the disc loading state. This driving of the stepper motor 43 is executed by step pulses associated with the step signal EXTSTEP being provided to the drive control unit 37.

Further, by such masking function, the power consumption used in this driving and the noise occurring in this driving may be reduced in the disc loading state.

This is because, the manners of change of logical levels of the switching signals, occurring when one step pulse of the step signal EXTSTEP has been provided to the drive control unit 37, are different between the disc unloading state and the disc loading state. That is, in the disc loading state, 4 times the change in logical levels of the switching signals are executed while in the disc unloading state only twice the change is executed.

In the example shown in FIG. 7J, in the disc unloading state, twice, S3 and S5 of the change are executed while in the disc loading state, 4 times, S2, S3, S4 and S5 are executed.

As mentioned above, with the disc apparatus according to the present invention, power saving and noise reduction may be achieved in the disc loading state. Thus, such a disc apparatus may be very useful for practical uses.

The present invention is not limited to such a magnetic disc apparatus. The present invention may be applied to other kinds of disc apparatus, such as including optical disc apparatuses and magneto-optical disc apparatuses.

Further, the present invention is not limited to the above described embodiments, and variations and modifications may be made without departing from the scope of the present invention.

What is claimed is:

1. A disc apparatus comprising:

at least one head for reading information from and/or recording information to a disc;

head driving means for driving said head on a disc in substantially radial direction thereof, the moving being executed in either a first driving manner or a second driving manner different from said first driving manner and the moving of said head effecting seeking a track formed on the disc;

disc loading detecting means for detecting loading of a disc in said disc apparatus; and switching means for switching between said first and second driving manners, wherein said switching means selects said first driving manner while a disc is loaded in said disc apparatus and said switching means selects said second driving manner while a disc is not loaded in said disc apparatus wherein said head driving means comprises a stepper motor having a first coil and a second coil which coils generate magnetic fields of substantially different phases; and wherein said stepper motor drive said head as a result of said first and second coils being energized in a first energizing manner while said first driving manner is applied and said stepper motor drives said head as a result of said first and second coils being energized in a second energizing manner while said second driving manner is applied; and wherein a double-phase energizing period and a single-phase energizing period alternate periodically in said first energizing manner, and said double energizing period is maintained in said second energizing manner; and wherein both said first and second coils are energized in said double-phase energizing period and either said first coil or said second coil is energized in said single-phase energizing period.

2. The disc apparatus according to claim 1, wherein:

said first energizing manner comprises at least one cycle comprising steps of:

a double-phase energizing step (S1) in which both said first and second coils are energized in a first polarity;

then a single-phase energizing step (S2) in which said first coil is energized in said first polarity and said second coil is not energized;

then a double-phase energizing step (S3) in which said first coil is energized in said first polarity and said second coil is energized in a second polarity different from said first polarity;

then a single-phase energizing step (S4) in which said first coil is not energized and said second coil is energized in said second polarity;

then a double-phase energizing step (S5) in which both said first and second coils are energized in said second polarity;

then a single-phase energizing step (S6) in which said first coil is energized in said second polarity and said second coil is not energized;

then a double-phase energizing step (S7) in which both said first is energized in said second polarity and second coil is energized in said first polarity; and then a single-phase energizing step (S8) in which said first coil is not energized and said second coil is energized in said first polarity;

said second energizing manner comprises at least one cycle comprising steps of:

a double-phase energizing step (S1) in which both said first and second coils are energized in a first polarity;

then a double-phase energizing step (S3) in which said first coil is energized in said first polarity and said second coil is energized in a second polarity different from said first polarity;

then a double-phase energizing step (S5) in which both said first and second coils are energized in said second polarity; and then a double-phase energizing step (S7) in which both said first coil is energized in said second polarity and second coil is energized in said first polarity.

3. The disc apparatus according to claim 1, wherein:

said first energizing manner comprises at least one cycle comprising steps of:

a single-phase energizing step (S8) in which said first coil is not energized and said second coil is energized in said first polarity;

then a double-phase energizing step (S7) in which both said first coil is energized in said second polarity and said second coil is energized in said first polarity; and then a single-phase energizing step (S6) in which said first coil is energized in said second polarity and said second coil is not energized;

then a double-phase energizing step (S5) in which both said first and second coils are energized in said second polarity;

then a single-phase energizing step (S4) in which said first coil is not energized and said second coil is energized in said second polarity;

then a double-phase energizing step (S3) in which said first coil is energized in said first polarity and said second coil is energized in a second polarity different from said first polarity;

then a single-phase energizing step (S2) in which said first coil is energized in said first polarity and said second coil is not energized; and then a double-phase energizing step (S1) in which both said first and second coils are energized in a first polarity;

said second energizing manner comprises at least one cycle comprising steps of:

a double-phase energizing step (S7) in which both said first coil is energized in said second polarity and said second coil is energized in said first polarity;

then a double-phase energizing step (S5) in which both said first and second coils are energized in said second polarity; and then a double-phase energizing step (S3) in which said first coil is energized in said first polarity and said second coil is energized in a second polarity different from said first polarity; and a double-phase energizing step (S1) in which both said first and second coils are energized in a first polarity.

4. The disc apparatus according to claim 1, wherein said head driving means comprises a servomotor which turns in a predetermined angle in response to each step pulse being applied thereto; and wherein the turning of said servomotor in said predetermined angle comprises first plurality of intermittent angles of sub-turning, said first plurality of intermittent angles of sub-turning being obtained as a result of dividing said predetermined angle by a first number while said first driving manner is applied, and the turning of said servomotor in said predetermined angle comprises second plurality of intermittent angles of sub-turning, said second plurality of intermittent angles of sub-turning being obtained as a result of dividing said predetermined angle by a second number different from said first number while said first driving manner is applied.

* * * * *